(12) United States Patent
Yoshitomi et al.

(10) Patent No.: US 11,989,372 B2
(45) Date of Patent: May 21, 2024

(54) INFORMATION PROCESSING APPARATUS AND CONTROLLING METHOD

(71) Applicant: Lenovo (Singapore) Pte. Ltd., Singapore (SG)

(72) Inventors: Keiichi Yoshitomi, Kanagawa (JP); Qiang Yao, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/168,575

(22) Filed: Feb. 14, 2023

(65) Prior Publication Data

US 2023/0289014 A1 Sep. 14, 2023

(30) Foreign Application Priority Data

Mar. 8, 2022 (JP) ................................ 2022-035656

(51) Int. Cl.
*G06F 3/041* (2006.01)
*G06F 3/0354* (2013.01)

(52) U.S. Cl.
CPC ...... *G06F 3/04182* (2019.05); *G06F 3/03545* (2013.01)

(58) Field of Classification Search
CPC .......................... G06F 3/04182; G06F 3/03545
USPC .................................................. 345/174, 179
See application file for complete search history.

(56) References Cited

U.S. PATENT DOCUMENTS

| 9,529,525 | B2 | 12/2016 | Skaljak et al. |
| 2015/0324084 | A1* | 11/2015 | Chen ...................... G06F 3/0416 345/173 |
| 2016/0188112 | A1* | 6/2016 | Forlines ................... G06N 5/04 345/173 |
| 2019/0310738 | A1 | 10/2019 | Dyvik et al. |
| 2022/0413637 | A1* | 12/2022 | Wu ...................... G06F 3/03547 |

FOREIGN PATENT DOCUMENTS

| JP | 2017122956 A | 7/2017 |
| WO | 2021098878 A1 | 5/2021 |

* cited by examiner

*Primary Examiner* — Jimmy H Nguyen
(74) *Attorney, Agent, or Firm* — Osha Bergman Watanabe & Burton LLP

(57) ABSTRACT

An information processing apparatus includes a display section; a touch sensor section which is arranged on a screen of the display section and detects touching of a manipulation medium on the screen; a denoising filter part which acquires first detected position data on the manipulation medium on the screen detected at predetermined detection intervals in response to touching of the manipulation medium on the screen, denoises the first detected position data on the basis of the first detected position data and thereby generates second detected position data; and an input processing part which acquires the second detected position data that the denoising filter part generates and makes the display section display a movement locus of the manipulation medium that the manipulation medium is moved on the screen in a state of touching on the screen on the basis of the second detected position data.

5 Claims, 10 Drawing Sheets

INFORMATION PROCESSING APPARATUS AND CONTROLLING METHOD

CROSS-REFERENCE TO RELATED APPLICATIONS

This application claims priority to Japanese Patent Application No. 2022-35656 filed on Mar. 8, 2022, the contents of which are hereby incorporated herein by reference in their entirety.

BACKGROUND

Technical Field

The present invention relates to an information processing apparatus and a controlling method.

Description of Related Art

In recent years, in information processing apparatuses such as a tablet terminal, a personal computer and so forth, there exists the apparatus of the type of being equipped with an input device which performs handwritten data input. For the purpose of reducing a delay in data display relative to data input, a technology of displaying predicted input data is known in such an input device as described above (for example, U.S. Pat. No. 9,529,525).

Incidentally, in the hand-written data input, the quality of drawing which indicates smoothness of a line which is drawn is an important factor in addition to input responsiveness which indicates the delay in data display relative to data input. An existing information processing apparatus has such a drawback that in a case where a process which uses a denoising filter is executed for the purpose of improving the quality of drawing, an amount of throughput is increased and the delay in data display relative to data input is also increased accordingly. In addition, there also exists such a drawback that in a case where it is intended to compensate for a delay amount which is induced by using the denoising filter, it becomes necessary to make large-scale predictions and consequently there occurs such a problem that a deviation between a predicted position and an actual input locus is increased. As described above, it is difficult for the existing information processing apparatuses to reduce the delay in data display relative to data input while maintaining the quality of the drawing result.

SUMMARY

The present invention has been made in order to solve the above-described problems and aims to provide an information processing apparatus and a controlling method of controlling operations of the information processing apparatus which make it possible to reduce the delay in data display relative to data input while maintaining the quality of the drawing result.

In order to solve the above-described problems, according to one aspect of the present invention, there is provided an information processing apparatus which includes a display section, a touch sensor section which is arranged on a screen of the display section and detects touching of a manipulation medium on the screen, a denoising filter part which acquires a plurality of pieces of first detected position data on the manipulation medium on the screen which is detected by the touch sensor section at predetermined detection intervals in response to touching of the manipulation medium on the screen, denoises the first detected position data on the basis of the plurality of pieces of the first detected position data and thereby generates second detected position data, and an input processing part which acquires the second detected position data that the denoising filter part generates and makes the display section display a movement locus of the manipulation medium that the manipulation medium is moved on the screen in a state of touching on the screen on the basis of the second detected position data, in which the input processing part includes a prediction processing portion which acquires the plurality of pieces of the first detected position data and generates predicted position data which indicates a predicted movement position of the manipulation medium on the basis of the plurality of pieces of the first detected position data and a display processing portion which makes the display section display the movement locus of the manipulation medium on the screen on the basis of the second detected position data and the predicated position data and thereafter, in a case where the display processing portion acquires the second detected position data which corresponds to the predicted position data, makes the display section display the movement locus of the manipulation medium on the screen by replacing the predicted position data with the second detected position data.

In addition, according to one aspect of the present invention, in the above-described information processing apparatus, the input processing part may include a switch processing portion which switches between the first detected data and the second detected data and thereby supplies either the first detected position data or the second detected position data to the prediction processing portion as a plurality of pieces of third detected position data and the prediction processing portion may generate the predicted position data which indicates the predicted movement position of the manipulation medium on the basis of the plurality of pieces of the third detected position data which is supplied from the switch processing portion.

In addition, according to one aspect of the present invention, in the information processing apparatus, the switch processing portion may switch between the first detected position data and the second detected position data in accordance with a moving velocity that the manipulation medium is moved on the screen.

In addition, according to one aspect of the present invention, in the information processing apparatus, the switch processing portion may switch between the first detected position data and the second detected position data in accordance with a moving acceleration that the manipulation medium is moved on the screen.

In addition, according to one aspect of the present invention, the information processing apparatus may further include a main control unit which executes a process which is based on an OS (Operating System), in which the main control unit may include the denoising filter part and the input processing part and the denoising filter part may be realized by a device driver which is added to the OS.

In addition, according to one aspect of the preset invention, in the information processing apparatus, the touch sensor section may include the denoising filter part.

According to another aspect of the present invention, there is provided a controlling method of controlling operations of an information processing apparatus which includes a display section, a touch sensor section which is arranged on a screen of the display section and detects touching of a manipulation medium on the screen, a denoising filter part and an input processing part. The controlling method includes the steps of acquiring a plurality of pieces of first detected position data on a manipulation medium on the screen which is detected in response to touching of the manipulation medium on the screen at predetermined detection intervals by the touch sensor section and denoising the first detected position data on the basis of the plurality of pieces of the first detected position data and then generating second detected position data which is denoised by the denoising filter part, and acquiring the second detected position data which is generated by denoising and making the display section display a movement locus that the manipulation medium is moved on the screen in a state of touching on the screen on the basis of the second detected position data by the input processing part, in which the input processing part executes a prediction process of acquiring the plurality of pieces of the first detected position data which is detected at the predetermined detection intervals and generating predicted position data which indicates a predicted movement position of the manipulation medium on the basis of the plurality of pieces of the first detected position data and a display process of making the display section display the movement locus of the manipulation medium on the screen on the basis of the second detected position data and the predicted position data and thereafter, in a case where the second detected position data which corresponds to the predicted position data is acquired, making the display section display the movement locus of the manipulation medium on the screen by replacing the predicted position data with the second detected position data.

According to the above-described aspects of the present invention, it becomes possible to reduce the delay in data display relative to data input while maintaining the quality of the drawing result.

DETAILED DESCRIPTION

In the following, information processing apparatuses according to first and second embodiments of the present invention and a controlling method of controlling operations of the information processing apparatus will be described with reference to the drawings.

First Embodiment

Figure 1:
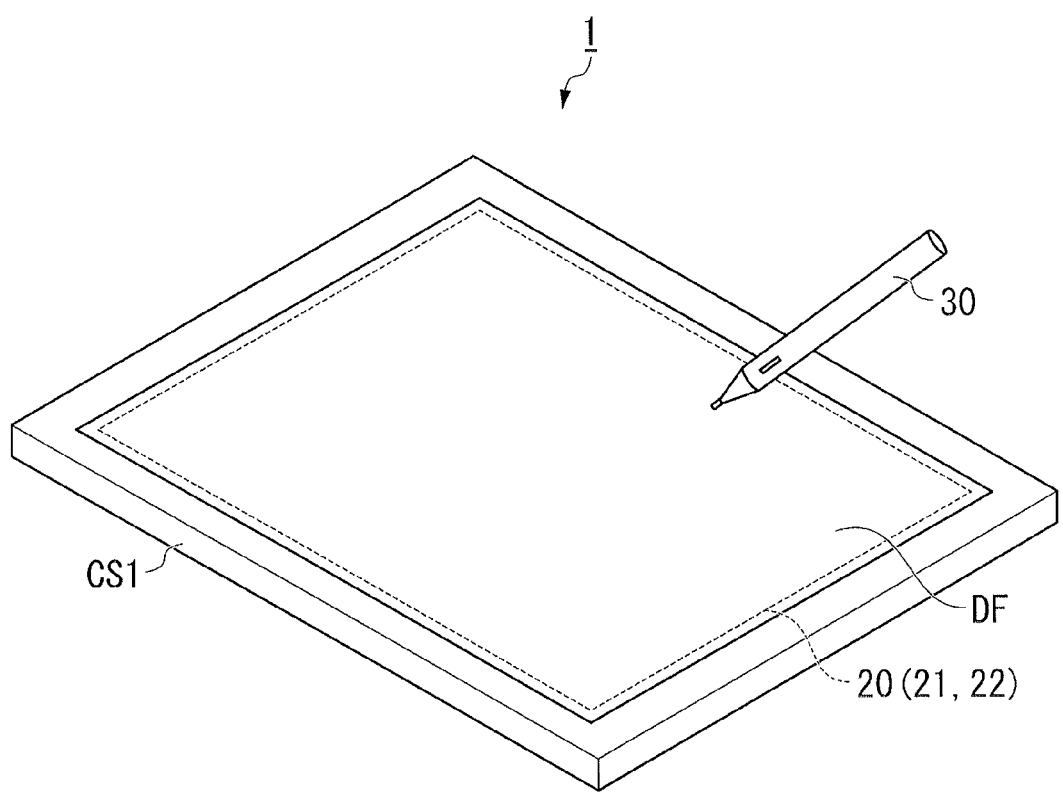
FIG. 1 is an external view illustrating one example of a tablet terminal according to the first embodiment of the present invention.

FIG. 1 is an external view illustrating one example of a tablet terminal 1 according to the first embodiment of the present invention. Incidentally, in the first embodiment of the present invention, the tablet terminal 1 will be described as one example of the information processing apparatus.

As illustrated in FIG. 1, on the tablet terminal 1, a touch screen 20 is installed on a one-side main surface of a chassis CS 1 in order to make a user execute an application program such as, for example, painting software and so forth by using a pen 30.

The touch screen 20 includes a display section 21 and a touch sensor section 22 and the display section 21 displays various kinds of information on a display screen DF.

The touch sensor section 22 is arranged in superposition on the display section 21 and detects touching of the pen 30 (one example of a manipulation medium) on the display screen DF of the display section 21 and detects a position that the pen 30 touches.

Incidentally, details of the touch screen 20, the display section 21 and the touch sensor section 22 will be described later.

Next, a main hardware configuration of the tablet terminal 1 will be described with reference to FIG. 2.

Figure 2:
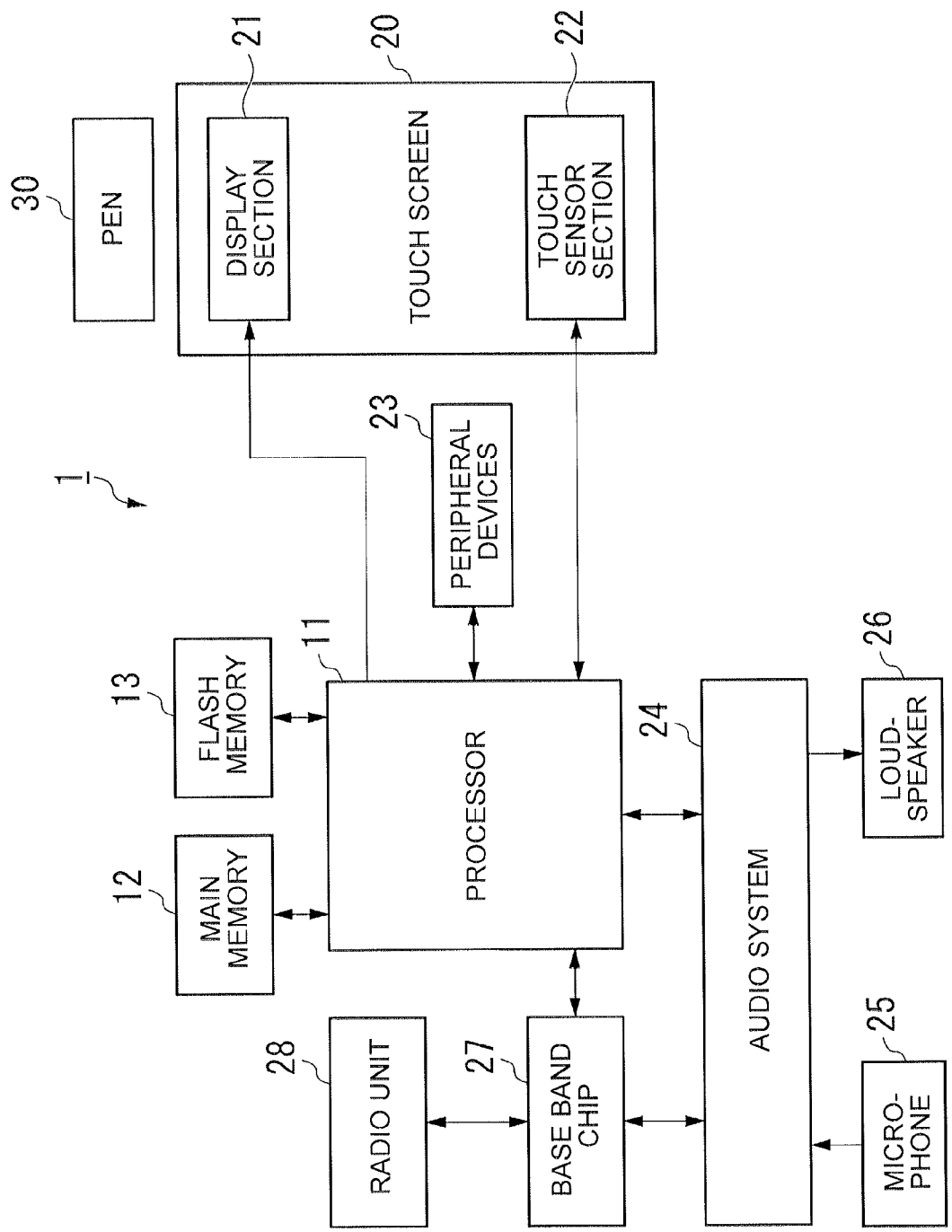
FIG. 2 is a diagram illustrating one example of a main hardware configuration of the tablet terminal according to the first embodiment of the present invention.

FIG. 2 is a diagram illustrating one example of the main hardware configuration of the tablet terminal 1 according to the first embodiment of the present invention.

As illustrated in FIG. 2, the tablet terminal 1 includes a processor 11, a main memory 12, a flash memory 13, the touch screen 20, peripheral devices 23, an audio system 24, a microphone 25, a loudspeaker 26, a base band chip 27 and a radio unit 28.

The processor 11 is an application processor which includes, for example, a CPU (Central Processing Unit). The processor 11 controls the entire operation of the tablet terminal 1.

The main memory 12 is a writable memory which is utilized as a read-in area of an execution program of the processor 11 or a working area that data which is processed in accordance with the execution program is written. The main memory 12 is configured by, for example, a plurality of DRAM (Dynamic Random Access Memory) chips. The execution program includes an OS (Operating System), various device drivers for operating peripherals in hardware, various services/utilities, an application program (application software) and so forth.

The flash memory 13 is, for example, a flash EEPROM (Electrically Erasable Programmable Read Only Memory) and stores the OS, the various device drivers, the various services/utilities, the application program (in the following, sometimes called the application) and various kinds of data.

The display section 21 is configured by, for example, a liquid crystal display, an organic EL (Electro-Luminescence) display or the like and displays a display screen which is based on drawing data (display data) which is output from the processor 11.

The touch sensor section 22 detects a position of the manipulation medium such as the pen 30 and so forth on the screen of the display section 21, touching of the pen 30 on the screen and a position that the pen 30 touches on the screen. It is possible for the touch sensor section 22 to detect the position of the pen 30 on the screen by, for example, an electrostatic capacitance system, an electromagnetic induction system and so forth. The touch sensor section 22 detects a plurality of pieces of detected position data (raw data) on the pen 30 at predetermined detection intervals.

In addition, the touch sensor section 22 includes not illustrated CPU and storage parts such as a RAM, a ROW (Random Access Memory) and so forth which are built in the touch sensor section 22. The CPU executes firmware that the storage parts store and thereby it becomes possible to execute various kinds of processes such as, for example, a process of denoising the detected position data on the pen 30 and so forth.

The peripheral devices 23 are, for example, a WLAN (Wireless Local Area Network) module, a Bluetooth (registered trademark) module, a GPS (Global Positioning System) module, sensors such as an acceleration sensor and so forth, a USB (Universal Serial Bus) connector and so forth.

The audio system 24 is, for example, an audio IC (Integrated Circuit) and inputs, records, reproduces and outputs sound data. For example, the microphone 25 and the loudspeaker 26 are connected to the audio system 24. The audio system 24 outputs the sound data that, for example, the microphone 25 picks up to the processor 11 or the baseband chip 27. In addition, the audio system 24 converts the sound data which is acquired from, for example, the processor 11 or the baseband chip 27 to sound signals and outputs the sound signals to the loudspeaker 26.

The microphone 25 picks up ambient sounds around the tablet terminal 1. The microphone 25 picks up sounds such as voices of a user and so forth, for example, in a case where the microphone 25 blends the user's voices with voices which are sent from other terminals.

The loudspeaker 26 outputs various kinds of sounds to the outside of the tablet terminal 1. The loudspeaker 26 outputs (emits) the sounds which are received from other terminals, for example, in a case where the loudspeaker 26 blends the user's voices with the voices which are sent from other terminals.

The baseband chip 27 is a dedicated IC which controls a radio communication which is made over, for example, a 4G (4-th Generation Mobile Communication System) network, a 5G (5-th Generation Mobile Communication System) network and so forth. The baseband chip 27 makes the loudspeaker 26 output, for example, voice data which is received by using the radio unit 28 via the audio system 24. In addition, the baseband chip 27 acquires, for example, sound data which is picked up from the microphone 25 via the audio system 24 and makes the sound data output over the mobile communication system network by using the radio unit 28. In addition, the baseband chip 27 establishes data communication with the processor 11 in order to transmit and receive input and output data for data communication over the mobile communication system network.

The radio unit 28 is a radio communication device which includes an antenna for the purpose of performing the radio communication over the mobile communication system network.

The pen 30 is a pen-shaped manipulation medium such as, for example, a touch pen, a stylus pen and so forth. Incidentally, the pen 30 may be also configured to include a resonance circuit, to be supplied with power with the aid of electromagnetic induction to a coil of the resonance circuit and thereby to be detectable depending on the position that the pen 30 touches on the screen of the display section 21 and the pen angle that the pen 30 touches on the screen by utilizing the resonance circuit.

Next, a functional configuration of the tablet terminal 1 according to the first embodiment of the present invention will be described with reference to FIG. 3.

Figure 3:
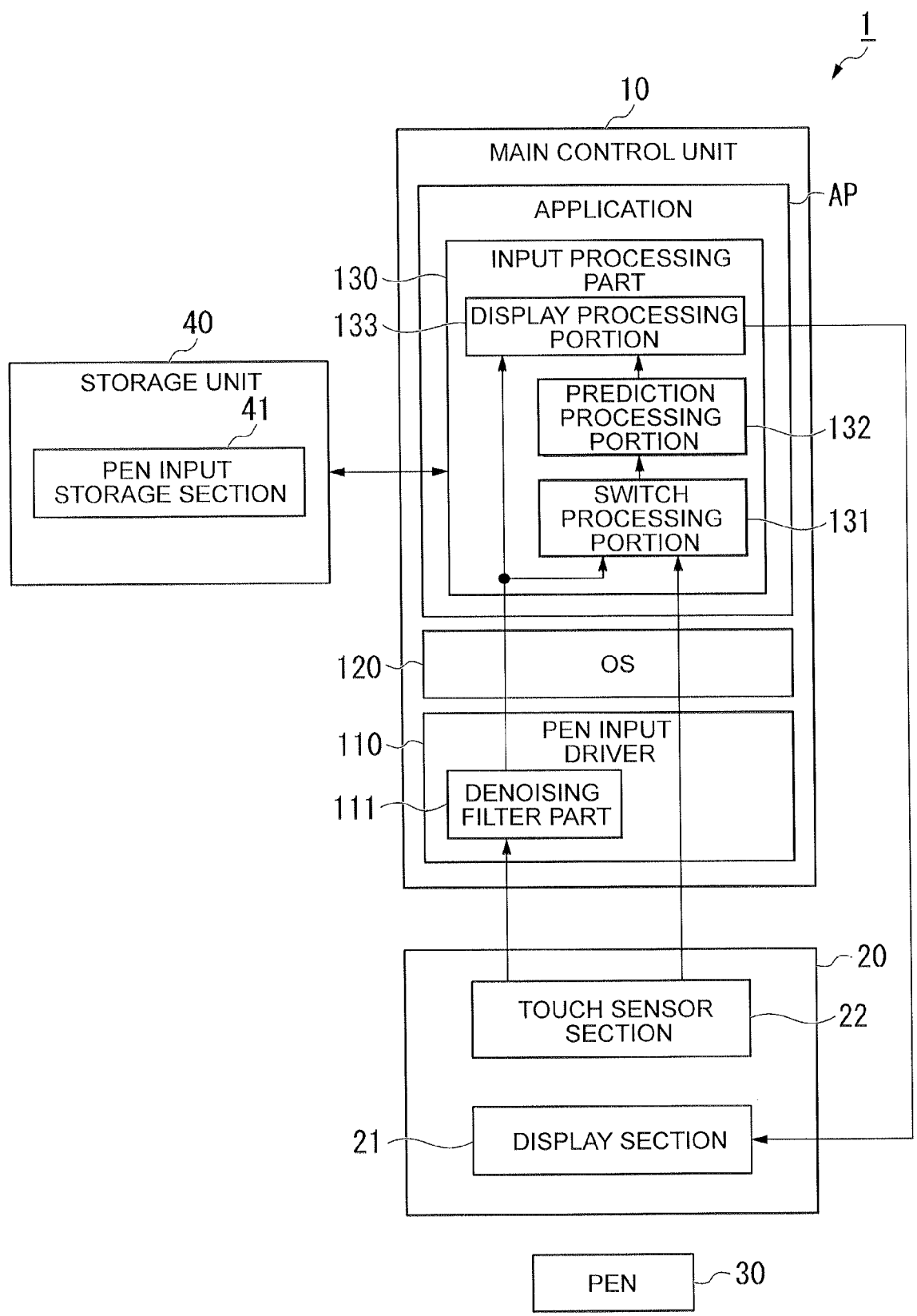
FIG. 3 is a block diagram illustrating one example of a functional configuration of the tablet terminal according to the first embodiment of the present invention.

FIG. 3 is a block diagram illustrating one example of the functional configuration of the tablet terminal 1 according to the first embodiment of the present invention.

As illustrated in FIG. 3, the tablet terminal 1 includes a main control unit 10, the touch screen 20, the pen 30 and a storage unit 40.

The touch screen 20 includes the display section 21 and the touch sensor section 22.

The storage unit 40 is realized by, for example, the main memory 12 or the flash memory 13 and includes a pen input storage section 41.

The pen input storage section 41 sequentially stores detected position data on the pen 30 that the touch sensor section 22 detects. The pen input storage section 41 stores, for example, denoised detected position data which is obtained by denoising (executing a smoothing process on) detected position raw data (RAW data) by a denoising filter part 111 which will be described later.

The main control unit 10 is a function unit which is realized by, for example, executing a program that the main memory 12 or the flash memory 13 stores by the processor 11 and executes various processes which are based on an OS (for example, Android (registered trademark) and so forth). The main control unit 10 includes a pen input driver 110, an OS 120 and an application AP which includes an input processing part 130.

The OS 120 is, for example, Android and so forth as described above and is a function section which is realized by executing the OS program that the main memory 12 or the flash memory 13 stores by the processor 11.

The pen input driver 110 is a device driver which executes pen input processing on the touch screen 20 (the touch sensor section 22) and is added to the OS. The pen input driver 110 is a function section which is realized by executing the OS program that the main memory 12 or the flash memory 13 stores by the processor 11. The pen input driver 110 supplies the denoised detected position data (the second detected data) which is obtained by executing the denoising process on the detected position raw data (the first detected position data) on the pen 30 which is supplied from the touch sensor section 22 to the input processing part 130 via the OS 120.

In addition, the pen input driver 110 supplies the detected position raw data (the first detected position data) on the pen 30 which is supplied from the touch sensor section 22 to the input processing part 130 via the OS 120 apart from the denoised detected position data (the second detected position data).

The pen input driver 110 includes the denoising filter part 111.

The denoising filter part 111 acquires the detected position raw data (the first detected position data) on the pen 30 from the touch sensor section 22, denoises the detected position raw data on the basis of a plurality of pieces of the detected position raw data which is detected at predetermined detection intervals and generates the denoised detected position data (the second detected position data). Incidentally, the denoising process which is executed by the denoising filter part 111 is called a smoothing process in some cases. The denoising filter part 111 supplies the denoised detected position data to the input processing part 130 via the OS 120.

The application AP is a function section which is realized by the processor 11 and executes predetermined processing and processes which include the pen input processing by making the processor 11 execute an application program such as, for example, painting software and so forth. The application AP includes the input processing part 130.

The input processing part 130 is a function part which is realized by executing the program that the main memory 12 or the flash memory 13 stores by the processor 11. The input processing part 130 acquires the denoised detected position data that the denoising filter part 111 generates and makes the display section 21 display the movement locus of the pen 30 on the screen that the pen 30 moves in a state of touching on the screen on the basis of the denoised detected position data.

The input processing part 130 acquires the detected position raw data (the first detected position data) from the touch sensor section 22 via the OS 120 and the pen input driver 110 and acquires the denoised detected position data from the denoising filter part 111 of the pen input driver 110 via the OS 120.

In addition, the input processing part 130 includes a switch processing portion 131, a prediction processing portion 132 and a display processing portion 133.

The switch processing portion 131 is a function portion which is realized by executing the program that the main memory 12 or the flash memory 13 stores by the processor 11. The switch processing portion 131 switches between the detected position raw data and the denoised detected position data and supplies the data which is obtained by data-switching to the prediction processing portion 132 as detected position data (third detected position data) to be supplied for execution of the prediction process.

The switch processing portion 131 switches between the detected position raw data and the denoised detected position data on the basis of a moving velocity and a moving acceleration of the pen 30 and supplies the data which is obtained by data-switching to the prediction processing portion 132.

Incidentally, details of a data-switching condition which is based on the moving velocity and the moving acceleration of the pen 30 will be described later.

The prediction processing portion 132 is a function portion which is realized by executing the program that the main memory 12 or the flash memory 13 stores by the processor 11. The prediction processing portion 132 generates predicted position data which indicates a predicted movement position of the pen 30 on the basis of a plurality of pieces of the detected position data to be supplied for execution of the prediction process (the third detected position data) which is supplied from the switch processing portion 131.

For example, in a case where the detected position raw data is supplied from the switch processing portion 131 as the detected position data to be supplied for execution of the prediction process, the prediction processing portion 132 acquires the detected position raw data and generates the predicted position data which indicates the predicted movement position of the pen 30 on the basis of the plurality of pieces of the detected position raw data which is detected at the predetermined detection intervals.

In addition, for example, in a case where the denoised detected position data is supplied from the switch processing portion 131 as the detected position data to be supplied for execution of the prediction process, the prediction processing portion 132 acquires the denoised detected position data and generates the predicted position data which indicates the predicted movement position of the pen 30 on the basis of the plurality of pieces of the denoised detected position data which is detected at the predetermined detection intervals. Here, a difference between the predicted position which is obtained on the basis of the detected position raw data and the predicted position which is obtained on the basis of the denoised detected position data will be described with reference to FIG. 4.

Figure 4:
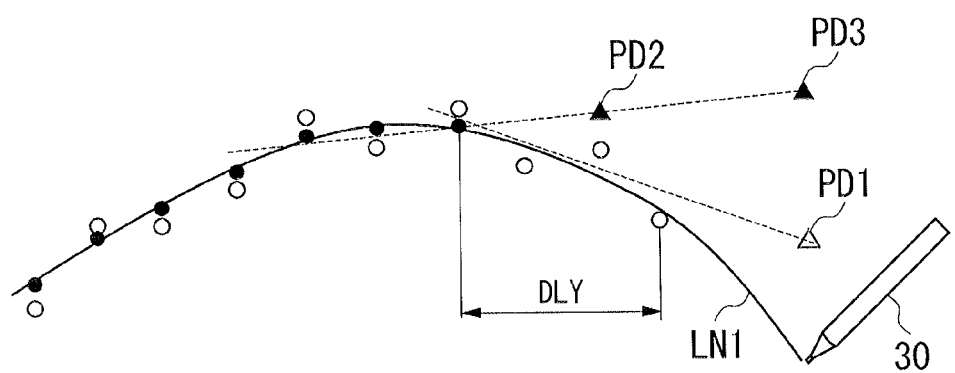
FIG. 4 is a diagram illustrating one example of a difference in predicted position between detected position raw data and denoised detected position data in the tablet terminal according to the first embodiment of the present invention.

FIG. 4 is a diagram illustrating one example of the difference between the predicted position which is obtained on the basis of the detected position raw data and the predicted position which is obtained on the basis of the denoised detected position data in the first embodiment of the present invention. Here, one example of a case where the movement locus of the pen 30 is curved will be described.

In FIG. 4, a line LN 1 indicates an actual movement locus of the pen 30. In addition, in FIG. 4, ○ (a white circle) indicates the detected position raw data and ● (a black circle) indicates the denoised detected position data. Incidentally, a delay DLY occurs between the detected position raw data and the denoised detected position data by execution of a denoising process. In the example which is illustrated in FIG. 4, it is supposed that the delay which corresponds to three samples of the detected position raw data occurs due to execution of the denoising process.

In addition, in FIG. 4, Δ (a white triangle) indicates predicted position data (a predicted position PD 1) which is based on the detected position raw data and ▲ (a black triangle) indicates predicted position data (a predicted position PD 2 and a predicted position PD 3) which is based on the denoised detected position data.

In the example which is illustrated in FIG. 4, the predicted position data (the predicted position PD 1) which is based on the detected position raw data indicates a predicted position which is closer to the line LN 1 which is the actual movement locus of the pen 30 than the predicted position data (the predicted position PD 2 and the predicted position PD 3) which is based on the denoised detected position data. In this case, the switch processing portion 131 supplies the detected position raw data to the prediction processing portion 132 as the detected position data to be supplied for execution of the prediction process.

Returning to the description in FIG. 3, the display processing portion 133 is a function portion which is realized by executing the program that the main memory 12 or the flash memory 13 stores by the processor 11. The display processing portion 133 makes the display section 21 display the movement locus of the pen 30 on the screen on the basis of the denoised detected position data and the predicated position data and, thereafter, in a case where the display processing portion 133 acquires the denoised detected position data which corresponds to the predicted position data, the display processing portion 133 makes the display section 21 display the movement locus of the pen 30 on the screen by replacing the predicted position data with the denoised detected position data.

Incidentally, in a case where the predicted position data is based on the detected position raw data, the display processing portion 133 makes the display section 21 display the movement locus of the pen 30 on the screen on the basis of the denoised detected position data, the detected position raw data of an amount which corresponds to a delay amount and the predicted position data which is based on the detected position raw data. Then, in a case where the display processing portion 133 acquires the denoised detected position data which corresponds to the detected position raw data of the amount which corresponds to the delay amount and the predicted position data, the display processing portion 133 makes the display section 21 display the movement locus of the pen 30 on the screen by replacing the detected position raw data of the amount which corresponds to the delay amount and the predicted position data with the denoised detected position data.

Figure 5:
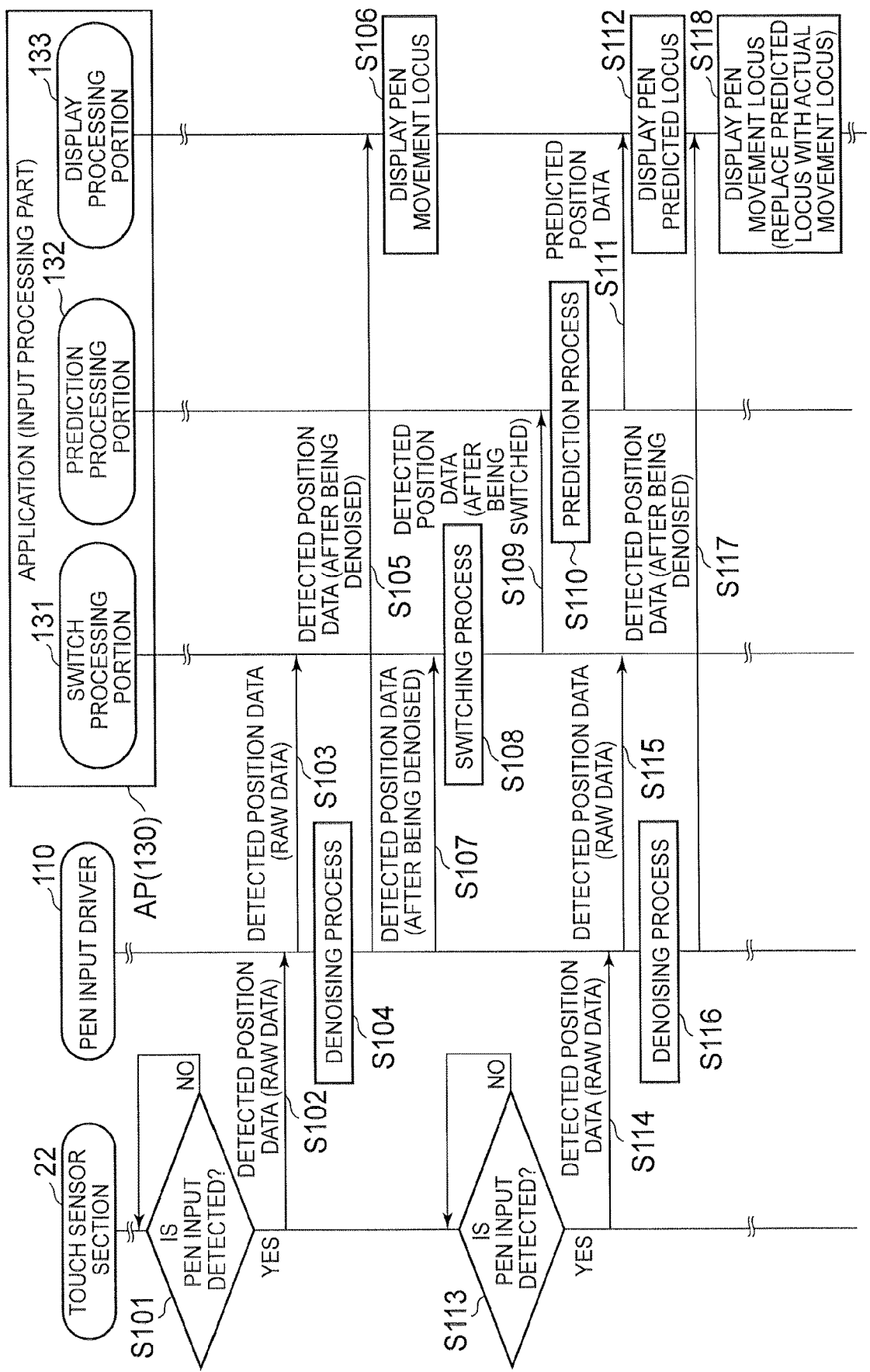
FIG. 5 is a diagram illustrating one example of operations of pen input processing of the tablet terminal according to the first embodiment of the present invention.
Figure 6A:
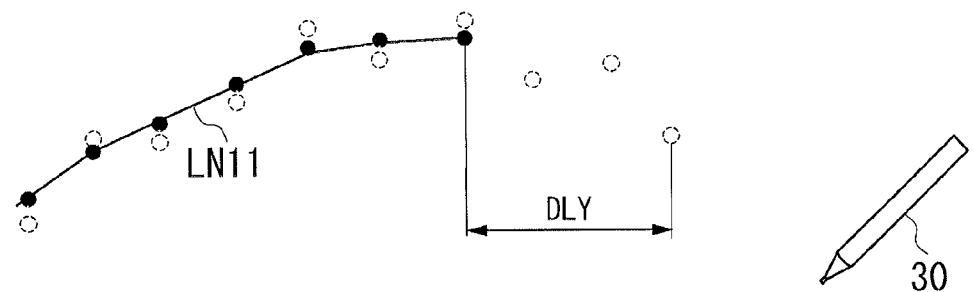
FIGS. 6A to 6C are diagrams illustrating one display example of pen input into the tablet terminal according to the first embodiment of the present invention.
Figure 6B:
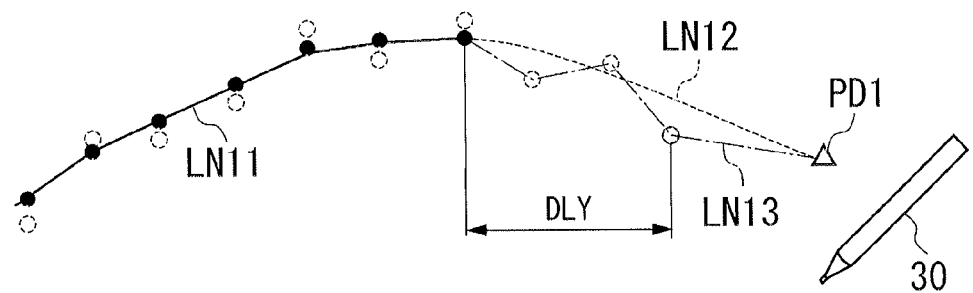
Figure 6C:
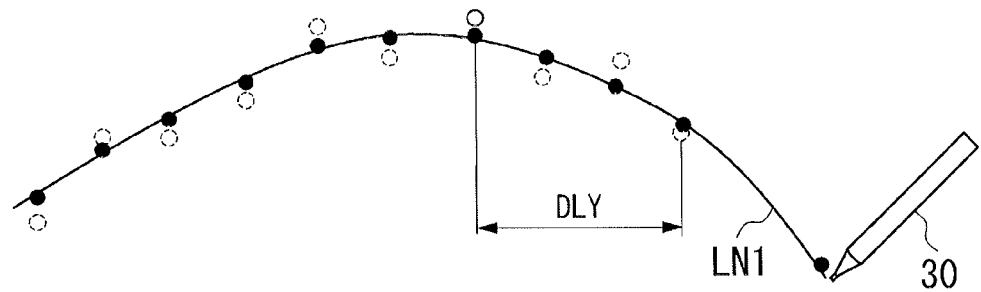

Next, operations of the tablet terminal 1 according to the first embodiment of the present invention will be described with reference to the drawings. FIG. 5 is a diagram illustrating one example of operations of the pen input processing that the tablet terminal 1 according to the first embodiment of the present invention executes. In addition, FIG. 6A, FIG. 6B and FIG. 6C are diagrams which respectively illustrate display examples of the operations of the pen input processing that the tablet terminal 1 according to the first embodiment of the present invention executes.

As illustrated in FIG. 5, first, the touch sensor section 22 of the tablet terminal 1 decides whether the pen input is detected (step S102). In a case where the pen input is detected (step 101: YES), the touch sensor section 22 proceeds the process to step S102. On the other hand, in a case where the pen input is not detected (step S101: NO), the touch sensor section 22 returns the process to step S101.

In step S102, the touch sensor section 22 outputs the detected position data (the detected position raw data) to the pen input driver 110.

Next, the pen input driver 110 transfers the detected position data (the detected position raw data) which is received from the touch sensor section 22 to the switch processing portion 131 (step S103).

In addition, the pen input driver 110 executes the denoising process (step S104). The denoising filter part 111 of the pen input driver 110 executes the denoising process on the basis of, for example, the plurality of pieces of the detected position raw data which is detected at the predetermined detection intervals and generates the denoised detected position data.

Next, the pen input driver 110 outputs the denoised detected position data to the display processing portion 133 (step S105).

Next, the display processing portion 133 displays the movement locus of the pen 30 (step S106). The display processing portion 133 makes the pen input storage section 41 store the denoised detected position data and makes the display section 21 display the movement locus of the pen 30 which is based on the denoised detected position data as indicated by a drawn line LN 11 in FIG. 6A.

Incidentally, FIG. 6A to FIG. 6C illustrate respective examples of a case where a curved line is input by the pen input. In addition, in FIG. 6A to FIG. 6C, ● (the black circle) indicates the denoised detected position data.

In addition, the pen input driver 110 outputs the denoised detected position data to the switch processing portion 131 (step S107).

Next, the switch processing portion 131 executes a selection process (step S108). The switch processing portion 131 selects either the detected position raw data or the denoised detected position data while switching between the detected position raw data and the denoised detected position data. For example, in a case where a line which is drawn by the pen input is curved, the switch processing portion 131 selects the detected position raw data.

Next, the switch processing portion 131 outputs the detected position data which is obtained after data-switching to the prediction processing portion 132 (step S109).

Next, the prediction processing portion 132 executes the prediction process (step S110). The prediction processing portion 32 generates the predicted position data on the basis of the detected position data which is output from the switch processing portion 131 and is obtained after data-switching.

Next, the prediction processing portion 132 outputs the predicted position data to the display processing portion 133 (step S111).

Next, the display processing portion 133 displays a predicted locus of the pen 30 (step S112). The display processing portion 133 makes the display section 21 display the predicted locus of the pen 30 which is based on the predicted position data as indicated by, for example, a drawn line LN 12 in FIG. 6B.

Incidentally, in FIG. 6B, A (the white triangle) indicates the predicted position PD 1 which is based on the detected position raw data. In addition, the display processing portion 133 may make the display section 21 display the predicted locus of the pen 30 on the basis of the detected position raw data of the amount which corresponds to the delay amount and the predicted position data which is based on the detected position raw data as indicated by a drawn line LN 13 in place of the drawn line LN 12.

Next, the touch sensor section 22 again decides whether the pen input is detected (step S113). In a case where the pen input is detected (step S113: YES), the touch sensor section 22 proceeds the process to step S114. On the other hand, in a case where the pen input is not detected (step S113: NO), the touch sensor section 22 returns the process to step S113.

In step S114, the touch sensor section 22 outputs the detected position data (the detected position raw data) to the pen input driver 110.

Next, the pen input driver 110 transfers the detected position data (the detected position raw data) which is received from the touch sensor section 22 to the switch processing portion 131 (step S115).

In addition, the pen input driver 110 executes the denoising process (step S116). The denoising filter part 111 of the pen input driver 110 executes the denoising process on the basis of, for example, the plurality of pieces of the detected position raw data which is detected at the predetermined detection intervals and generates the denoised detected position data.

Next, the pen input driver 110 outputs the denoised detected position data to the display processing portion 133 (step S117).

Next, the display processing portion 133 displays the movement locus of the pen 30 (step S118). In the example in FIG. 5, the display processing portion 133 replaces the predicted locus of the pen 30 with the actual movement locus of the pen 30 and makes the display section 21 display the actual movement locus of the pen 30. The display processing portion 133 makes the pen input storage section 41 store the denoised detected position data and makes the display section 21 display the movement locus of the pen 30 which is based on the denoised detected position data as indicted by the drawn line LN 1 in FIG. 6C.

Incidentally, processes which will be executed in steps which come after step S118 are the same as the processes which are executed in step S107 to step S112 and therefore description thereof will be omitted here.

In addition, finally, the pen input driver 110 supplies the denoised detected position data that the pen input storage section 41 stores to the application AP. That is, in the application AP, the denoised detected position data that the pen input storage section 41 stores is used as the input data (the detected position data) on the pen 30.

Next, an operation of switching to a setting of outputting data to the prediction processing portion 132 of the tablet terminal 1 according to the first embodiment of the present invention will be described with reference to FIG. 7.

Figure 7:
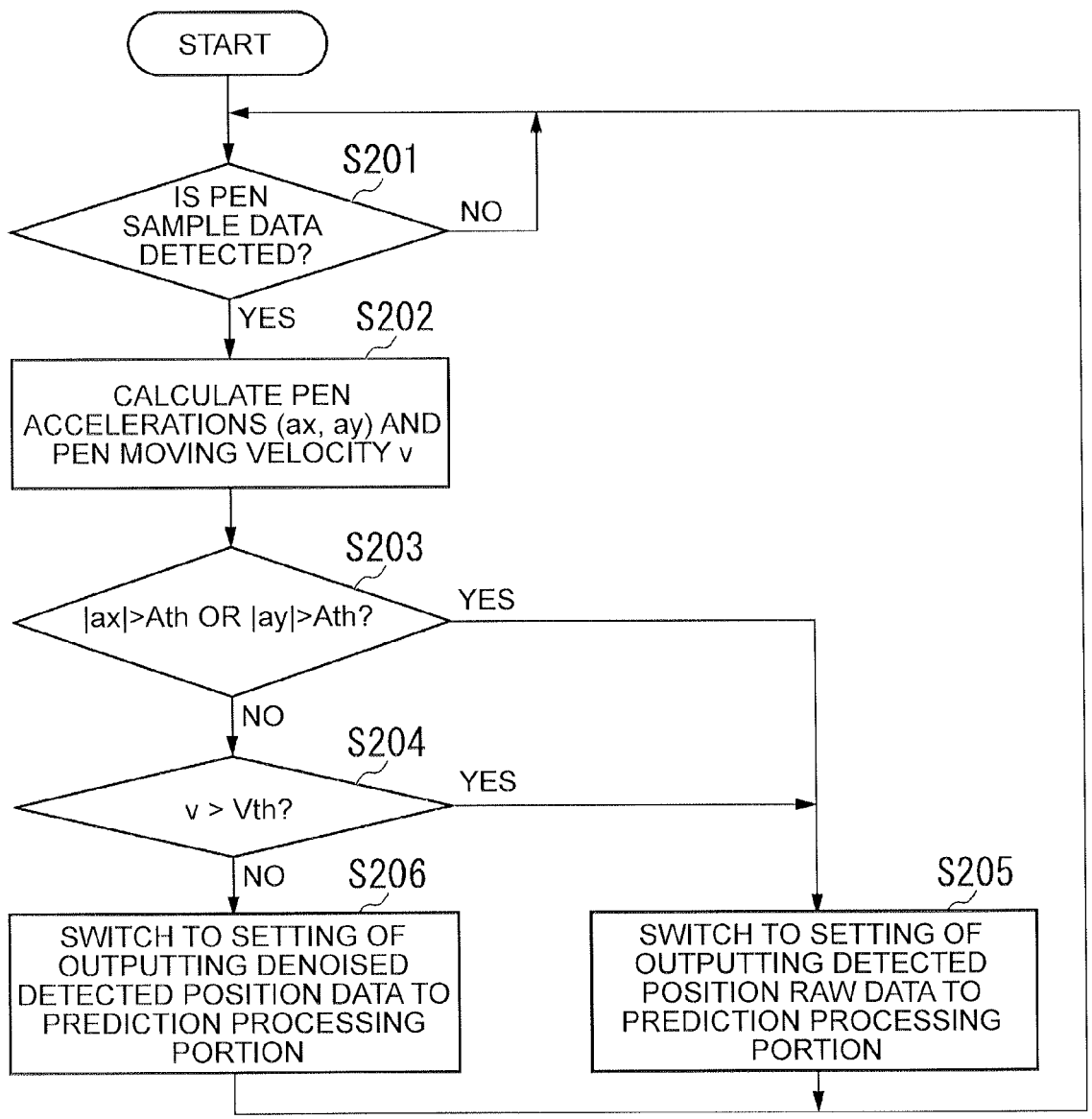
FIG. 7 is a flowchart illustrating one example of operations of switching to a setting of outputting data to a prediction processing portion of the tablet terminal according to the first embodiment of the present invention.

FIG. 7 is a flowchart illustrating one example of the operation of switching to the setting of outputting data to the prediction processing portion 132 of the tablet terminal 1 according to the first embodiment of the present invention.

As illustrated in FIG. 7, first, the switch processing portion 131 of the tablet terminal 1 decides whether pen sample data is detected (step S201). The switch processing portion 131 decides, for example, whether the detected position raw data is received as detection of the pen sample data. In a case where the detected position raw data is received (step S201: YES), the switch processing portion 131 proceeds the process to step S202. On the other hand, in a case where the detected position raw data is not received (step S201: NO), the switch processing portion 131 returns the process to step S201.

In step S202, the switch processing portion 131 calculates accelerations (ax, ay) of the pen 30 and a moving velocity v of the pen 30. The switch processing portion 131 calculates the moving velocity v that the pen 30 is moved on the screen and calculates the X-axis direction acceleration ax and the Y-axis direction acceleration ay of the pen 30 which is moved on the screen on the basis of a predetermined number of pieces of the detected position raw data which is detected at the predetermined detection intervals.

Next, the switch processing portion 131 decides whether either an absolute value of the acceleration ax or an absolute value of the acceleration ay is more than an acceleration threshold value Ath (either |ax|>Ath or |ay|>Ath) (step S203). In the example in FIG. 7, a case where either the absolute value of the acceleration ax or the absolute value of the acceleration ay is more than the acceleration threshold value Ath corresponds to a case where the pen 30 is rapidly accelerated, is rapidly decelerated or is moved along a curved line. In a case where either the absolute value of the acceleration ax or the absolute value of the acceleration ay is more than the acceleration threshold value Ath (step S203: YES), the switch processing portion 131 proceeds the process to step S205. On the other hand, in a case where both the absolute value of the acceleration ax and the absolute value of the acceleration ay are less than the acceleration threshold value Ath (step S203: NO), the switch processing portion 131 proceeds the process to step S204.

In step S204, the switch processing portion 131 decides whether the moving velocity v is more than a velocity threshold value Vth (v>Vth). In a case where the moving velocity v is more than the velocity threshold value Vth (step S204: YES), the switch processing portion 131 proceeds the process to step S205. On the other hand, in a case where the moving velocity v is less than the velocity threshold value Vth (step S204: NO), the switch processing portion 131 proceeds the process to step S206.

In step S205, the switch processing portion 131 switches to a setting of outputting the detected position raw data to the prediction processing portion 132. That is, the switch processing portion 131 supplies the detected position raw data to the prediction processing portion 132 as the detected position data to be supplied for execution of the prediction process. After execution of the process in step S205, the switch processing portion 131 returns the process to step S201.

In addition, in step S206, the switch processing portion 131 switches to a setting of outputting the denoised detected position data to the prediction processing portion 132. That is, the switch processing portion 131 supplies the denoised detected position data to the prediction processing portion 132 as the detected position data to be supplied for execution of the prediction process. After execution of the process in step S206, the switch processing portion 131 returns the process to step S201.

Next, concrete examples of an operation of switching the prediction process of the table terminal 1 according to the first embodiment of the present invention will be described with reference to FIG. 8.

Figure 8:
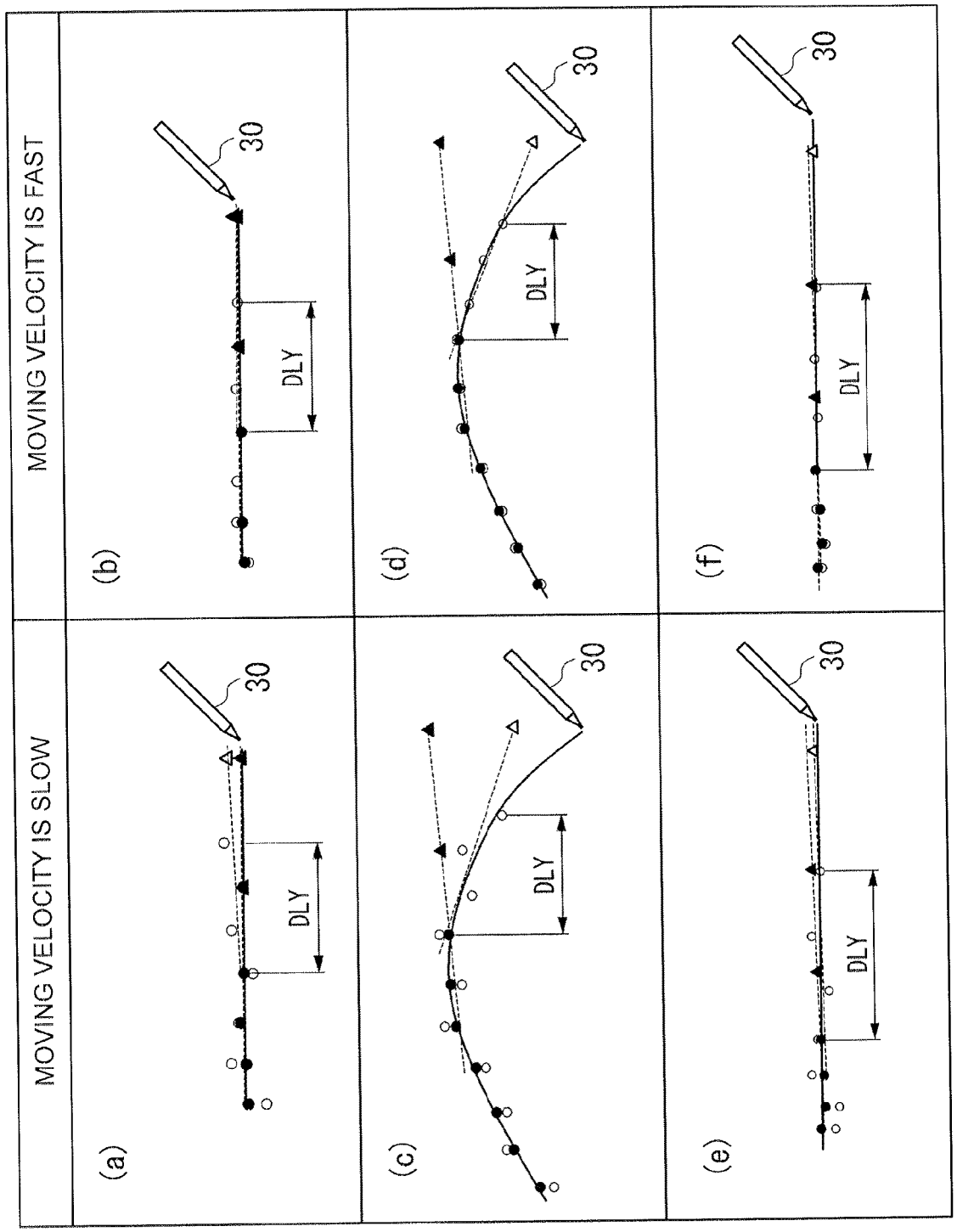
FIG. 8 is a diagram illustrating one example of one operation of switching to the setting of outputting data to the prediction processing portion of the tablet terminal according to the first embodiment of the present invention.

FIG. 8 is a diagram which each illustrates one example of the operation of switching the prediction process of the tablet terminal 1 according to the first embodiment of the present invention. Incidentally, in FIG. 8, meanings of ● (the black circle), ○ (the white circle), ▲ (the black triangle) and △ (the white triangle) are the same as the meanings of these marks which are described above with reference to FIG. 4.

FIG. 8(a) and FIG. 8(b) illustrate examples of cases where the pen 30 is moved on the screen in uniform linear motion. FIG. 8(a) illustrates one example of a case where the moving velocity is slow (the moving velocity v≤Vth) and FIG. 8(b) illustrates one example of a case where the moving velocity is fast (the moving velocity v>Vth).

As illustrated in FIG. 8(a), in a case where the pen 30 is moved in the uniform linear motion and the moving velocity is slow, the locus becomes closer to the actual movement locus of the pen 30 by executing the prediction process on the basis of the denoised detected position data than by executing the prediction process on the basis of the detected position raw data. Therefore, in this case, the switch processing portion 131 supplies the denoised detected position data to the prediction processing portion 132 as the detected position data to be supplied for execution of the prediction process.

In addition, as illustrated in FIG. 8(b), in a case where the pen 30 is moved in the uniform linear motion and the moving velocity is fast, the drawing quality which is obtained by executing the prediction process on the basis of the detected position raw data is equivalent to the drawing quality which is obtained by executing the prediction process on the basis of the denoised detected position data. However, the detected position raw data makes it possible to more reduce a throughput which is necessary for execution of the denoising process and a processing delay. Accordingly, in this case, the switch processing portion 131 supplies the detected position raw data to the prediction processing portion 132 as the detected position data to be supplied for execution of the prediction process.

In addition, FIG. 8(c) and FIG. 8(d) illustrate examples of a case where the pen 30 is moved on the screen in curvilinear motion. This case corresponds to a state where either the absolute value of the acceleration ax or the absolute value of the acceleration ay is more than the acceleration threshold value Ath (either |ax|>Ath or |ay|>Ath). In addition, the example which is illustrated in FIG. 8(c) indicates a case where the moving velocity is slow (the moving velocity v≤Vth) and the example which is illustrated in FIG. 8(d) indicates a case where the moving velocity is fast (the moving velocity v>Vth).

As illustrated in FIG. 8(c), in a case where the pen 30 is moved in the curvilinear motion and the moving velocity is slow, the locus becomes closer to the actual movement locus of the pen 30 and a delay in data display relative to data input is more reduced by executing the prediction process on the basis of the detected position raw data than by executing the prediction process on the basis of the denoised detected position data. Accordingly, in this case, the switch processing portion 131 supplies the detected position raw data to the prediction processing portion 132 as the detected position data to be supplied for execution of the prediction process.

In addition, as illustrated in FIG. 8(d), in a case where the pen 30 is moved in the curvilinear motion and the moving velocity is fast, the locus becomes closer to the actual movement locus of the pen 30 and the delay in data display relative to data input is more reduced by executing the prediction process on the basis of the detected position raw data than by executing the prediction process on the basis of the denoised detected position data. Accordingly, in this case, the switch processing portion 131 supplies the detected position raw data to the prediction processing portion 132 as the detected position data to be supplied for execution of the prediction process.

In addition, FIG. 8(e) and FIG. 8(f) illustrate examples of a case where the pen 30 is moved on the screen rectilinearly and in an accelerated state. This case corresponds to the state where either the absolute value of the acceleration ax or the absolute value of the acceleration ay is more than the acceleration threshold value Ath (either |ax|>Ath) or (|ay|>Ath). In addition, the example which is illustrated in FIG. 8(e) indicates a case where the moving velocity is slow (the moving velocity v≤Vth) and the example which is illustrated in FIG. 8(f) indicates a case where the moving velocity is fast (the moving velocity v>Vth).

As illustrated in FIG. 8(e), in a case where the pen 30 is moved in the accelerated linear motion and the moving velocity is slow, the locus becomes closer to the actual movement locus of the pen 30 and the delay in data display relative to data input is more reduced by executing the prediction process on the basis of the detected position raw data than by executing the prediction process on the basis of the denoised detected position data. Accordingly, in this case, the switch processing portion 131 supplies the detected position raw data to the prediction processing portion 132 as the detected position data to be supplied for execution of the prediction process.

In addition, as illustrated in FIG. 8(f), in a case where the pen 30 is moved in the accelerated linear motion and the moving velocity is fast, the locus becomes closer to the actual movement locus of the pen 30 and the delay in data display relative to data input is more reduced by executing the prediction process on the basis of the detected position raw data than by executing the prediction process on the basis of the denoised detected position data. Therefore, in this case, the switch processing portion 131 supplies the detected position raw data to the prediction processing portion 132 as the detected position data to be supplied for execution of the prediction process.

Incidentally, also in a case where the pen 30 is moved in the linear motion in a decelerated state, the pen 30 is moved in the manner which is the same as the manners which are illustrated in FIG. 8(e) and FIG. 8(f).

The switch processing portion 131 switches between the detected position raw data and the denoised detected position data in accordance with the moving velocity of the pen 30 on the screen in this way. Specifically, in a case where the moving velocity of the pen 30 on the screen is more than the predetermined threshold value (the velocity threshold value Vth), the switch processing portion 131 supplies the detected position raw data to the prediction processing portion 132 as the detected position data to be supplied for execution of the prediction process.

In addition, the switch processing portion 131 switches between the detected position raw data and the denoised detected position data in accordance with the moving acceleration of the pen 30 on the screen. Specifically, in a case where the absolute values of the moving accelerations (the acceleration ax, the acceleration ay) of the pen 30 on the screen are more than the predetermined threshold value (the acceleration threshold value Ath), the switch processing portion 131 supplies the detected position raw data to the prediction processing portion 132 as the detected position data to be supplied for execution of the prediction process.

In addition, in a case where the moving velocity of the pen 30 on the screen is less than the predetermined threshold value (the velocity threshold value Vth) and both the absolute values of the moving accelerations (the acceleration ax and the acceleration ay) of the pen 30 on the screen are less than the predetermined threshold value (the acceleration threshold value Ath), the switch processing portion 131 supplies the denoised detected position data to the prediction processing portion 132 as the detected position data to be supplied for execution of the prediction process.

As described above, the tablet terminal 1 (the information processing apparatus) according to the first embodiment of the present invention includes the display section 21, the touch sensor section 22, the denoising filter part 111, the input processing part 130 and so forth. The touch sensor section 22 is disposed on the screen of the display section 21 and detects touching of the pen 30 (the manipulation medium) on the screen. The pen 30 (the manipulation medium) touches on the screen and thereby the denoising filter part 111 acquires the plurality of pieces of the detected position raw data (the first detected position data) on the screen which is detected at the predetermined detection intervals by the touch sensor section 22, denoises the detected position raw data on the basis of the plurality of pieces of the detected position raw data which is detected at the predetermined detection intervals and generates the denoised detected position data (the second detected position data). The input processing part 130 acquires the denoised detected position data that the denoising filter part 111 generates and makes the display section 21 display the movement locus of the pen 30 on the screen that the pen 30 is moved in the state of touching on the screen on the basis of the denoised detected position data. In addition, the input processing part 130 includes the prediction processing portion 132 and the display processing portion 133. The prediction processing portion 132 acquires the plurality of pieces of the detected position raw data which is detected at the predetermined detection intervals and generates the predicted position data which indicates the predicted movement position of the pen 30 on the basis of the plurality of pieces of the detected position raw data. The display processing portion 133 makes the display section 21 display the movement locus of the pen 30 on the screen on the basis of the denoised detected position data and the predicted position data. Then, in a case where the display processing portion 133 acquires the denoised detected position data which corresponds to the predicted position data, the display processing portion 133 makes the display section 21 display the movement locus of the pen 30 on the screen by replacing the predicted position data with the denoised detected position data.

Thereby, it becomes possible for the tablet terminal 1 according to the first embodiment of the present invention to reduce a deviation of the predicted position data relative to the data input by the pen 30 and to reduce the delay in data display relative to data input by displaying the predicted position data which is based on the detected position raw data (the first detected position data) (see, for example, FIG. 4). In addition, since the tablet terminal 1 according to the first embodiment of the present invention is configured to make the display section 21 display the movement locus of the pen 30 on the screen by replacing the predicted position data with the denoised detected position data, it becomes possible for the tablet terminal 1 to maintain the quality of the final drawing result. Accordingly, it becomes possible for the tablet terminal 1 according to the first embodiment of the present invention to reduce the delay in data display relative to data input while maintaining the quality of the drawing result.

In addition, in the first embodiment, the input processing part 130 also includes the switch processing portion 131. The switch processing portion 131 switches between the detected position raw data and the noised detected position data and supplies either the detected position raw data or the denoised detected position data to the prediction processing portion 132 as the detected position data (the third detected position data) to be supplied for execution of the prediction process. The prediction processing portion 132 generates the predicted position data which indicates the predicted movement position of the pen 30 on the basis of the plurality of pieces of the detected position data to be supplied for execution of the prediction process which is supplied from the switch processing portion 131.

Thereby, it becomes possible for the tablet terminal 1 according to the first embodiment of the present invention to use either the predicted position data which is based on the detected position raw data or the predicted position data which is based on the denoised detected position data while switching between these two kinds of the predicted position data in accordance with the situation. Accordingly, it becomes possible for the tablet terminal 1 according to the first embodiment of the present invention to reduce the delay in data display relative to data input by flexibly switching between the prediction processes to be executed in accordance with the situation and, in addition, while maintaining the quality of the drawing result.

In addition, in the first embodiment of the present invention, the switch processing portion 131 switches between the detected position raw data and the denoised detected position data in accordance with the moving velocity (for example, the moving velocity v) that the pen 30 is moved by the user on the screen.

Thereby, it becomes possible for the tablet terminal 1 according to the first embodiment of the present invention to appropriately switch between the prediction processes to be executed in accordance with the moving velocity of the pen 30.

In addition, in the first embodiment of the present invention, the switch processing portion 131 switches between the detected position raw data and the denoised detected position data in accordance with the moving acceleration (for example, the acceleration ax or the acceleration ay) that the pen 30 is moved by the user on the screen.

Thereby, it becomes possible for the tablet terminal 1 according to the first embodiment of the present invention to appropriately switch between the prediction processes to be executed in accordance with the motion of the pen 30, such as, for example, the uniform linear motion, the accelerated linear motion, a decelerated linear motion, the curvilinear motion and so forth.

In addition, the tablet terminal 1 according to the first embodiment of the present invention includes the main control unit 10 which executes OS-based processing. The main control unit 10 includes the denoising filter part 111 and the input processing part 130. The denoising filter part 111 is realized by a device driver which is added to the OS 120.

Thereby, it becomes possible for the tablet terminal 1 according to the first embodiment of the present invention to appropriately switch between the prediction processes to be executed in accordance with the motion of the pen 30, such as, for example, the uniform linear motion, the accelerated linear motion, the decelerated linear motion, the curvilinear motion and so forth.

In addition, in the first embodiment of the present invention, in a case where the predicted position data is based on the detected position raw data, the display processing portion 133 makes the display section 21 display the movement locus of the pen 30 on the screen on the basis of the denoised detected position data, the detected position raw data of the amount which corresponds to the delay amount and the predicted position data which is based on the detected position raw data. Then, in a case where the display processing portion 133 acquires the denoised detected position data which corresponds to the detected position raw data of the amount which corresponds to the delay amount and the predicted position data, the display processing portion 133 makes the display section 21 display the movement locus of the pen 30 on the screen by replacing the detected position raw data of the amount which corresponds to the delay amount and the predicted position data with the denoised detected position data.

Thereby, in a case where the predicted position data is based on the detected position raw data, it becomes possible for the tablet terminal 1 according to the first embodiment of the present invention to make the display section 21 display the movement locus of the pen 30 which contains the predicted position data appropriately.

In addition, according to the first embodiment of the present invention, there is also provided a controlling method of controlling the operations of the tablet terminal 1 which includes the display section 21 and the touch sensor section 22 which is disposed on the screen of the display section 21 and detects touching of the manipulation medium on the screen. The controlling method includes executing the denoising process and executing the input processing. In the denoising process, the denoising filter part 111 acquires the plurality of pieces of the detected position raw data (the first detected position data) on the screen which is detected by the touch sensor section 22 at the predetermined detection intervals by touching the pen 30 on the screen, denoises the detected position raw data on the basis of the plurality of pieces of detected position raw data and generates the denoised detected position data (the second detected position data). In the input processing, the input processing part 130 acquires the denoised detected position data which is generated by execution of the denoising process and makes the display section 21 display the movement locus that the pen 30 is moved in a state of touching on the screen on the basis of the denoised detected position data. In addition, the input processing part 130 executes a prediction process and a display process in the input processing. The input processing part 130 acquires the detected position raw data and generates the predicted position data which indicates the predicted movement position of the pen 30 on the basis of the plurality of pieces of the detected position raw data as the prediction process. The input processing part 130 makes the display section 21 display the movement locus of the pen 30 on the screen on the basis of the denoised detected position data and the predicted position data and, then, in a case where the input processing part 130 acquires the denoised detected position data which corresponds to the predicted position data, the input processing part 130 makes the display section 21 display the movement locus of the pen 30 on the screen by replacing the predicted position data with the denoised detected position data as the display process.

Thereby, it becomes possible for the controlling method according to the first embodiment to exhibit the effects which are the same as the effects of the tablet terminal 1 according to the first embodiment and to reduce the delay in data display relative to data input while maintaining the quality of the drawing result.

Incidentally, the tablet terminal 1 (the information processing apparatus) according to the first embodiment of the present invention may be also configured as follows. In this case, the tablet terminal 1 (the information processing apparatus) 1 includes the display section 21, the touch sensor section 22 which detects the position that the manipulation medium (for example, the pen 30) touches on the screen of the display section 21, the main memory (the memory) 12 which temporarily stores the program and the processor 11 which executes the program which is stored in the main memory 12. The processor 11 executes the program which is stored in the main memory 12 and thereby executes the denoising process and the input processing. In the denoising process, the processor 11 acquires the plurality of pieces of the detected position raw data (the first detected position data) on the pen 30 on the screen which is detected by the touch sensor section 22 at the predetermine detection intervals by touching the pen 30 on the screen, denoises the detected position raw data on the basis of the plurality of pieces of the detected position raw data and generates the denoised detected position data (the second detected position data). In the input processing, the processor 11 acquires the denoised detected position data which is generated by execution of the denoising process and makes the display section 21 display the movement locus of the pen 30 on the screen that the pen 30 is moved in a state of touching on the screen on the basis of the denoised detected position data. In addition, in the input processing, the processor 11 executes the prediction process and the display process. As the prediction process, the processor 11 acquires the plurality of pieces of the detected position raw data which is detected at predetermined detection intervals and generates the predicted position data which indicates the predicted movement position of the pen 30 on the basis of the plurality of pieces of the detected position raw data. As the display process, the processor 11 makes the display section 21 display the movement locus of the pen 30 on the screen on the basis of the denoised detected position data and the predicted position data and then, in a case where the processor 11 acquires the denoised detected position data which corresponds to the predicted position data, the processor 11 makes the display section 21 display the movement locus of the pen 30 on the screen by replacing the predicted position data with the denoised detected position data.

Thereby, it becomes possible for the tablet terminal 1 according to the first embodiment of the present invention to exhibit the effects which are the same as the effects of the controlling method and to reduce a delay in data display relative to hand-written data input while improving prediction accuracy in a case where the hand-written data is input.

Second Embodiment

Next, a tablet terminal 1*a* according to the second embodiment of the present invention will be described with reference to the drawings.

Figure 9:
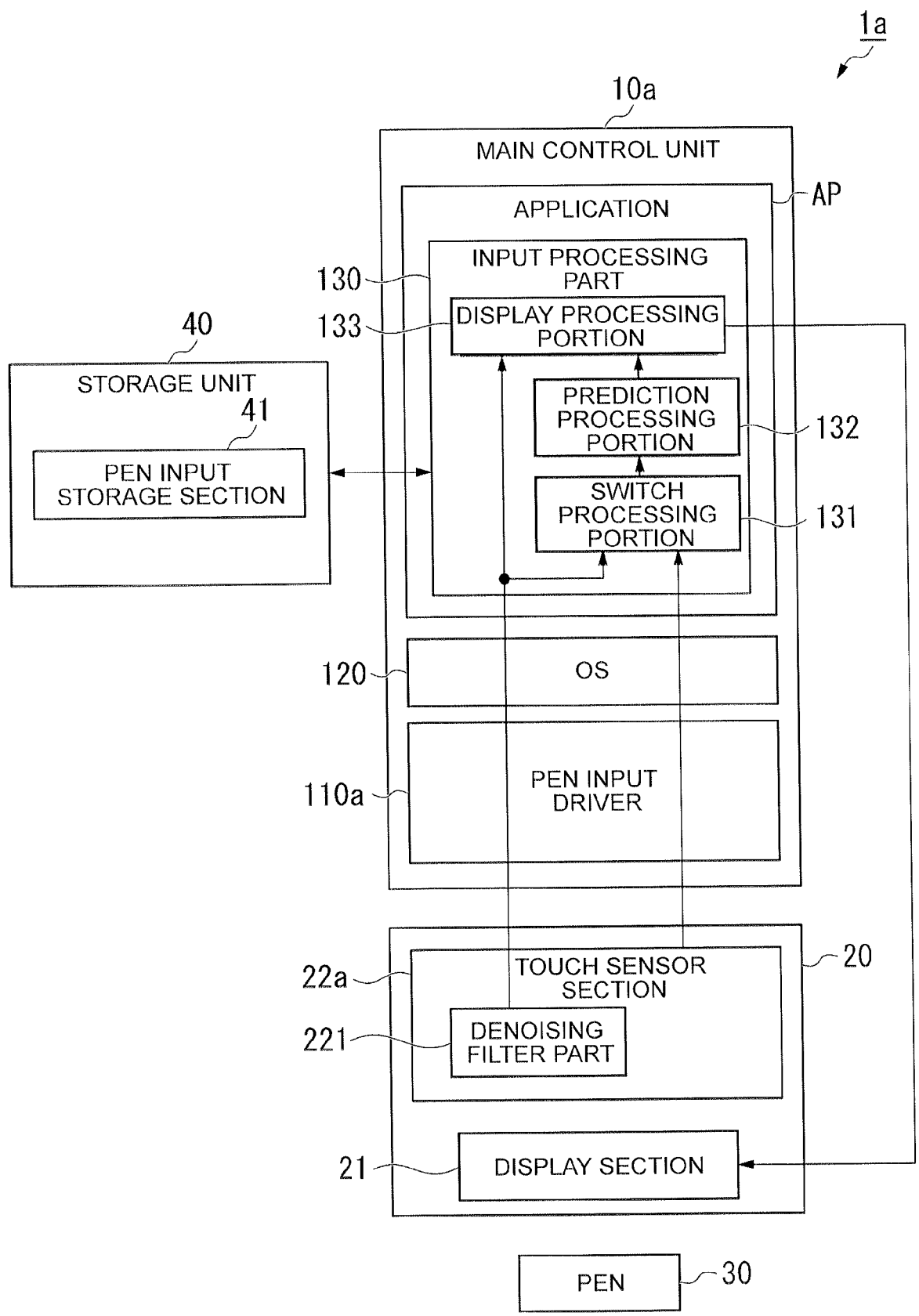
FIG. 9 is s block diagram illustrating one example of a functional configuration of a tablet terminal according to the second embodiment of the present invention.

FIG. 9 is a block diagram illustrating one example of a functional configuration of the tablet terminal 1*a* according to the second embodiment of the present invention. In the second embodiment, a modified example that a touch sensor section 22*a* executes the denoising process on the detected position raw data in place of the pen input driver 110 will be described.

Incidentally, an external view and a main hardware configuration of the tablet terminal 1*a* according to the second embodiment are the same as those of the tablet terminal 1 according to the first embodiment which are illustrated in FIG. 1 and FIG. 2 and therefore the description of the external view and the hardware configuration of the tablet terminal 1*a* will be omitted here.

As illustrated in FIG. 9, the tablet terminal 1*a* includes a main control unit 10*a*, the touch screen 20, the pen 30, the storage unit 40 and so forth. Incidentally, in FIG. 9, the symbols which are the same as the symbols which are assigned to the constitutional elements in in FIG. 3 are also assigned to constitutional elements which are the same as those in FIG. 3 and the description thereof will be omitted.

In addition, the touch screen 20 includes the display section 21 and the touch sensor section 22*a*.

The touch sensor section 22*a* is arranged in superposition on the display section 21 and detects touching of the pen 30 (one example of the manipulation medium) on the display screen DF of the display section 21 and detects the position that the pen 30 touches on the display screen DF. The touch sensor section 22*a* detects the plurality of pieces of the detected position raw data on the pen 30 at the predetermined detection intervals.

In addition, the touch sensor section 22*a* includes not-illustrated CPU and storage parts such as a RAM (Random Access Memory), a ROM (Read Only Memory) and so forth which are built in the touch sensor section 22*a*. The CPU executes firmware that the storage part 40 stores and thereby it becomes possible to execute various processes such as, for example, the process of denoising the detected position raw data on the pen 30 and so forth. The touch sensor section 22*a* includes a denoising filter part 221.

The denoising filter part 221 is a function part which is realized by executing the firmware by the not-illustrated CPU of the touch sensor section 22*a*. The denoising filter part 221 acquires the plurality of pieces of the detected position raw data (the first detected position data) on the pen 30 from the touch sensor section 22*a* at predetermined detection intervals, denoises the detected position raw data on the basis of the plurality of pieces of the detected position raw data which is detected at the predetermined detection intervals and generates the denoised detected position data (the second detected position data). The denoising filter part 221 supplies the denoised detected position data to the input processing part 130 via the pen input driver 110*a* and the OS 120.

In addition, the touch sensor section 22*a* supplies the detected position raw data to the input processing part 130 via the pen input driver 110*a* and the OS 120, apart from the denoised detected position data.

The pen input driver 110*a* is a device driver which executes the pen-input processing on the touch screen 20 (the touch sensor section 22*a*) and is added to the OS 120. The pen input driver 110*a* is a function section which is realized by executing an OS program that the main memory 12 or the flash memory 13 stores by the processor 11.

The pen input driver 110*a* supplies the denoised detected position data and the detected position raw data which are received from the touch sensor section 22*a* to the input processing part 130 via the OS 120.

In addition, the functions of the OS 120 and the input processing part 130 are the same as the functions of the OS 120 and the input processing part 130 in the first embodiment which is illustrated in FIG. 3 and therefore the description of the functions thereof will be omitted here.

Next, the operations of the tablet terminal 1*a* according to the second embodiment of the present invention will be described with reference to the drawing.

Figure 10:
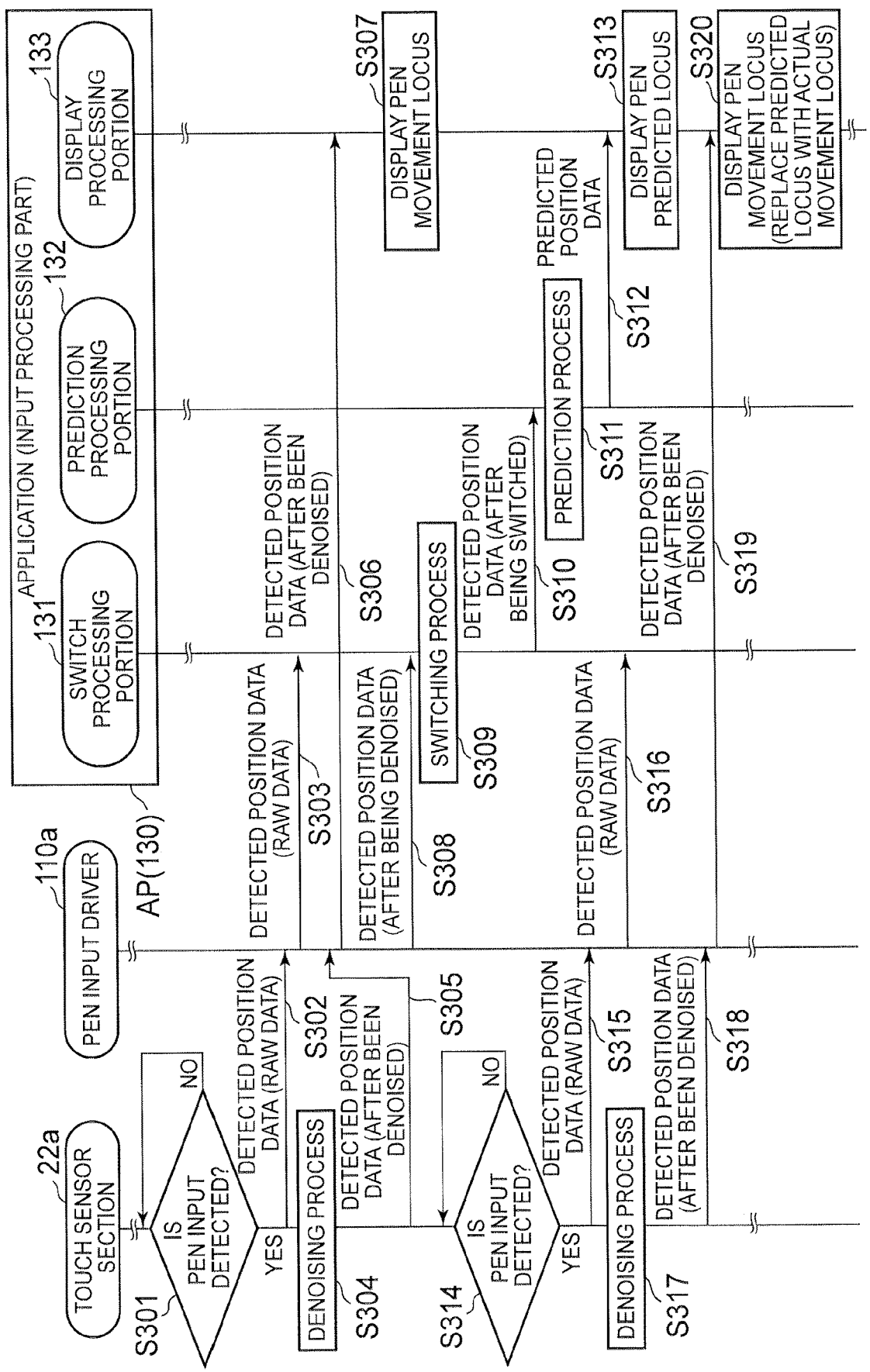
FIG. 10 is a diagram illustrating one example of operations of pen input processing of the tablet terminal according to the second embodiment of the present invention.

FIG. 10 is a diagram illustrating one example of the operations of pen-input processing of the tablet terminal 1*a* according to the second embodiment of the present invention. In addition, FIG. 10 is the diagram illustrating a display example of the pen-input processing of the tablet terminal 1*a* according to the second embodiment of the present invention.

As illustrated in FIG. 10, first, the touch sensor section 22*a* of the tablet terminal 1*a* decides whether the pen input is detected (step S301). In a case where the pen input is detected (step 301: YES), the touch sensor section 22*a* proceeds the process to step S302. On the other hand, in a case where the pen input is not detected (step S301: NO), the sensor section 22*a* returns the process to step S301.

Since the processes which will be executed in subsequent step S302 and step S303 are the same as the processes in step S102 and step S103 which are illustrated in FIG. 5, description thereof will be omitted here.

Next, the touch sensor section 22*a* executes the denoising process (step S304). The denoising filter part 221 of the touch sensor section 22*a* executes the denoising process on the basis of, for example, the plurality of pieces of detected position raw data which is detected at the predetermined detection intervals and generates the denoised detected position data.

Next, the touch sensor section 22*a* outputs the denoised detected position data to the pen input driver 110*a* (step S305).

Next, the pen input driver 110*a* outputs the denoised detected position data which is received from the touch sensor section 22*a* to the display processing portion 133 (step S306).

Next, the display processing portion 133 displays the movement locus of the pen 30 (step S307). The display processing portion 133 makes the pen input storage section 41 store the denoised detected position data and makes the display section 21 display the movement locus of the pen 30 which is obtained on the basis of the denoised detected position data.

Next, the pen input driver 110*a* transfers the denoised detected position data which is received from the touch sensor section 22*a* to the switch processing portion 131 (step S308).

Since the processes which will be executed in subsequent step S309 to step S313 are the same as the processes which are executed in step S108 to step S112 which are illustrated in FIG. 5, the description of these processes will be omitted here.

Next, the touch sensor section 22*a* again decides whether the pen input is detected (step S314). In a case where the pen input is detected (step 314: YES), the touch sensor section 22*a* proceeds the process to step S315. On the other hand, in a case where the pen input is not detected (step S314: NO), the touch sensor section 22*a* returns the process to step S314.

Since the processes which will be executed in subsequent step S315 to step S319 are the same as the processes which are executed in step S302 to step S306 which are described above, the description of these processes will be omitted here.

Next, in step S320, the display processing portion 133 displays the movement locus of the pen 30. In step S320, the display processing portion 133 replaces the predicted locus of the pen 30 with the actual movement locus of the pen 30 and makes the display section 21 display the actual movement locus of the pen 30. The display processing portion 133 makes the pen input storage section 41 store the denoised detected position data and makes the display section 21 display the movement locus of the pen 30 which is based on the denoised detected position data as indicated by the drawn line LN 1 in FIG. 6C.

Incidentally, the processes which comes after the process in step S320 are the same as the processes which are executed in step S308 to step S313 and therefore the description of these processes will be omitted here.

In addition, finally, the pen input driver 110*a* supplies the denoised detected position data that the pen input storage section 41 stores to the application AP. That is, in the application AP, the denoised detected position data that the pen input storage section 41 stores is used as the input data (the detected position data) on the pen 30.

In addition, since the prediction process switching operation that the tablet terminal 1*a* according to the second embodiment performs is the same as the prediction process switching operation in the first embodiment which is illustrated in FIG. 7, the description thereof will be omitted here.

As described above, the tablet terminal 1*a* (the information processing apparatus) according to the second embodiment includes the display section 21, the touch sensor section 22*a*, the denoising filter part 221, the input processing part 130 and so forth. The touch sensor section 22*a* includes the denoising filter part 221. The touch sensor section 22*a* supplies the denoised detected position data on the pen 30 that the denoising filter part 221 generates by executing the denoising process and the detected position row data on the pen 30 that the touch sensor section 22*a* detects to the input processing part 130.

Thereby, it becomes possible for the tablet terminal 1*a* according to the second embodiment of the present invention to exhibit the effects which are the same as the effects of the tablet terminal 1 according to the first embodiment of the present invention and to reduce the delay in data display relative to data input while maintaining the quality of the drawing effect.

Incidentally, the present invention is not limited to the above-described respective embodiments and it is possible to modify the configuration of the present invention in a variety of ways within the range not deviating from the gist of the present invention.

For example, although the example that the information processing apparatus is the tablet terminal 1 (1*a*) is described in each of the first and second embodiments, the information processing apparatus is not limited to the tablet terminal. The information processing apparatus may be, for example, a smartphone, a laptop PC (personal Computer) which has the tablet mode and so forth.

For example, in a case where the information processing apparatus is the laptop PC, the information processing apparatus may be configured such that an embedded controller (a sub-control unit) executes the denoising process in place of the pen input driver 110 (or the touch sensor section 22*a*).

In addition, although the example that the manipulation medium is the pen is described in each of the first and second embodiments, the manipulation medium is not limited to the pen 30 and other manipulation media such as, for example, a user's finger and so forth may be also used.

Incidentally, each constitutional element that the tablet terminal 1 (1*a*) includes has a computer system which is built therein. Then, each process of each constitutional element that the tablet terminal 1 (1*a*) includes may be performed by recording a program for realizing a function of each constitutional element that the tablet terminal 1 (1*a*) includes in a computer-readable recording medium, making the computer system read in the program which is recorded in the recording medium and then executing the program. Here, "making the computer system read in the program which is recorded in the recording medium and then executing the program" includes to install the program into the computer system. Here, "the computer system" shall include the OS and hardware such as the peripherals and so forth.

In addition, the "computer system" may also include a plurality of computer devices which is mutually connected over a network which includes communication lines such as the Internet, a WAN (Wide Area Network), a LAN (Local Area Network), a leased line and so forth. In addition, the "computer-readable recording medium" means a portable medium such as a flexible disc, a magneto-optical disc, a ROM (Read Only Memory), a CD-ROM (Compact Disc-ROM) and so forth and a storage device which is built in each computer system such as a hard disc and so forth. As described above, the recording medium which stores the program may be also a non-transitory computer-readable recording medium such as the CD-ROM and so forth.

In addition, also an internally or externally installed recording medium which is accessible from a distribution server for distribution of the program concerned is included in the recording medium. Incidentally, a configuration that one program is divided into a plurality of partial programs and these partial programs are downloaded at mutually different timings and then the partial programs are mutually combined by the respective constitutional elements that the tablet terminal 1 (1*a*) includes may be also made and distribution servers which distribute the divided partial programs respectively may be different from one another. Further, "the computer readable recording medium" shall also include a medium of the type of holding the program for a definite period of time such as a server which works in this way in a case where the program is transmitted to the server over the network and a volatile memory (a RAM (Random Access Memory)) which is built in each computer system which serves as a client. In addition, the program may be of the type of realizing some of the above-described functions. Further, the program may be of the type of making it possible to realize the above-described functions by combination with a program which is recorded in advance in each computer system, that is, may be also a so-called differential file (a differential program).

In addition, some of or all the functions which are described above may be realized in the form of an integrated circuit such as an LSI (Large Scale Integration) and so forth. The respective functions may be processorized individually and/or some of or all the functions may be mutually integrated and then processorized. In addition, a technique of circuit integration may be realized by a private circuit or a general-purpose processor, not limited to the LSI. In addition, in a case where a novel circuit integration technology which realizes an integrated circuit which will take the place of the existing LSI emerges owing to advancement of the semiconductor technology, the integrated circuit which is realized by the novel technology may be also used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1, 1*a*: tablet terminal
10, 10*a*: main control unit
11: processor
12: main memory
13: flash memory
20: touch screen
21: display section
22, 22*a*: touch sensor section
23: peripheral devices
24: audio system
25: microphone
26: loudspeaker
27: baseband chip
28: radio unit
30: pen
40: storage unit
41: pen input storage section
110, 110*a*: pen input driver
111, 221: denoising filter part
120: OS
130: input processing part
131: switch processing portion
132: prediction processing portion
133: display processing portion
AP: application
CS 1: chassis
DF: display screen

What is claimed is:

1. An information processing apparatus comprising:
a display;
a touch sensor that is arranged on a screen of the display and that detects a plurality of pieces of first detected position data at predetermined detection intervals in response to touching of a manipulation medium on the screen;
a denoising filter that, when executed by a processor, acquires from the touch sensor the first detected position data on the manipulation medium on the screen and denoises the first detected position data to generate second detected position data; and
the processor that acquires the second detected position data and causes the display to display, based on the second detected position data, a movement locus of the manipulation medium that moves on the screen in a state of touching the screen, wherein the processor further:
   acquires the first detected position data,
   upon detecting that a moving velocity or a moving acceleration of the manipulation medium is larger than a predetermined threshold value:
      generates, based on the first detected position data rather than the second detected position data, predicted position data that indicates a predicted movement position of the manipulation medium, and
      causes the display to display the movement locus of the manipulation medium on the screen based on the second detected position data and the predicted position data generated based on the first detected position data, and
   upon generating the predicted position data based on the second detected position data:
      causes the display to display the movement locus of the manipulation medium on the screen based on the second detected position data and the predicted position data generated based on the second detected position data.

2. The information processing apparatus according to claim 1, wherein
the processor further:
   switches between the first detected data and the second detected data and thereby supplies either the first detected position data or the second detected position data depending on the moving velocity or the moving acceleration of the manipulation medium, and
   upon detecting that the moving velocity or the moving acceleration of the manipulation medium is equal to or less than the predetermined threshold value, generates, based on the second detected position data rather than the first detected position data, the predicted position data that indicates the predicted movement position of the manipulation medium.

3. The information processing apparatus according to claim 1, wherein
the processor executes a process based on an Operating System (OS), and
the denoising filter is realized by a device driver that is added to the OS.

4. The information processing apparatus according to claim 1, wherein
the touch sensor includes the denoising filter.

5. A controlling method of controlling operations of an information processing apparatus that comprises: a display; a touch sensor that is arranged on a screen of the display and detects touching of a manipulation medium on the screen; a denoising filter; and a processor, the method comprising:
   detecting, by the touch sensor, a plurality of pieces of first detected position data at predetermined detection intervals in response to touching of a manipulation medium on the screen;
   acquiring, when executed the denoising filter by the processor, from the touch sensor the first detected position data on the manipulation medium on the screen, and denoising the first detected position data to generate second detected position data;
   acquiring, by the processor, the second detected position data, and causing the display to display, based on the second detected position data, a movement locus of the manipulation medium that moves on the screen in a state of touching the screen;
   acquiring, by the processor, the first detected position data;
   upon the processor detecting that a moving velocity or a moving acceleration of the manipulation medium is larger than a predetermined threshold value:
      generating, by the processor based on the first detected position data rather than the second detected position data, predicted position data that indicates a predicted movement position of the manipulation medium, and
      causing, by the processor, the display to display the movement locus of the manipulation medium on the screen based on the second detected position data and the predicted position data generated based on the first detected position data; and
   upon the processor generating the predicted position data based on the second detected position data:
      causing, by the processor, the display to display the movement locus of the manipulation medium on the screen based on the second detected position data and the predicted position data generated based on the second detected position data.

* * * * *